US007943014B2

(12) United States Patent
Berruti et al.

(10) Patent No.: US 7,943,014 B2
(45) Date of Patent: May 17, 2011

(54) APPARATUS AND PROCESS FOR THE PYROLYSIS OF AGRICULTURAL BIOMASS

(75) Inventors: Franco Berruti, London (CA); Cedric Briens, London (CA); Ronald Golden, Cambridge (CA)

(73) Assignee: Agri-Therm Inc. (CA)

( * ) Notice: Subject to any disclaimer, the term of this patent is extended or adjusted under 35 U.S.C. 154(b) by 427 days.

(21) Appl. No.: 11/915,388

(22) PCT Filed: Jun. 7, 2006

(86) PCT No.: PCT/CA2006/000933
§ 371 (c)(1),
(2), (4) Date: Feb. 21, 2008

(87) PCT Pub. No.: WO2006/130977
PCT Pub. Date: Dec. 14, 2006

(65) Prior Publication Data
US 2008/0197012 A1 Aug. 21, 2008

Related U.S. Application Data

(60) Provisional application No. 60/688,338, filed on Jun. 8, 2005.

(51) Int. Cl.
*C10B 51/00* (2006.01)
(52) U.S. Cl. ............ 202/108; 48/62 R; 48/111; 202/99; 202/121; 202/222; 422/145
(58) Field of Classification Search .................. 202/99, 202/108, 115, 121, 208, 215, 222, 262; 48/62 R, 48/111; 422/140, 142, 145, 146, 147; 110/245; 201/12, 31
See application file for complete search history.

(56) References Cited

U.S. PATENT DOCUMENTS

| | | | | |
|---|---|---|---|---|
| 1,134,580 A * | 4/1915 | Balassa | ............ | 48/118.5 |
| 2,768,937 A * | 10/1956 | Wigton | ............ | 201/4 |
| 3,562,115 A * | 2/1971 | Dunlop | ............ | 201/1 |
| 3,853,498 A * | 12/1974 | Bailie | ............ | 201/12 |
| 4,135,889 A * | 1/1979 | Mori | ............ | 422/147 |
| 4,243,489 A | 1/1981 | Green | | |
| 4,917,028 A | 4/1990 | Ganster et al. | | |
| 5,296,102 A * | 3/1994 | Nicklin | ............ | 202/223 |
| 5,728,271 A | 3/1998 | Piskorz et al. | | |

(Continued)

OTHER PUBLICATIONS

Donald S. Scott et al., A second look at fast pyrolysis of biomass—the RTI process, Journal of Analytical and Applied Pyrolysis, 51 (1999) 23-37.

(Continued)

*Primary Examiner* — Sean E Conley
*Assistant Examiner* — Joye L Woodard
(74) *Attorney, Agent, or Firm* — Katten Muchin Rosenman LLP

(57) ABSTRACT

An integrated combustion chamber and fluidized bed pyrolysis reactor. In one embodiment, the combustion chamber is cylindrical and the pyrolysis reactor is provided annularly about the combustion chamber with an annular wall that provides a common surface for heat transfer. A lift tube in fluid communication with the pyrolysis reactor is provided within the combustion chamber for circulating biomass and an inert fluidizable media upwardly through the lift tube; this advantageously increases heat transfer and leads to more rapid pyrolysis. The media and biomass exit the lift tube into either a freeboard area of the pyrolysis reactor or into a low density region of the fluidized bed. A condensable gaseous product is produced during pyrolysis that has economic value. The apparatus and process are especially well suited to the pyrolysis of low density agricultural biomass. The apparatus is compact and particularly well suited to mobile operation.

11 Claims, 5 Drawing Sheets

U.S. PATENT DOCUMENTS

| | | | |
|---|---|---|---|
| 5,792,340 | A | 8/1998 | Freel et al. |
| 5,853,548 | A | 12/1998 | Piskorz et al. |
| 5,961,786 | A | 10/1999 | Freel et al. |
| 6,048,374 | A | 4/2000 | Green |
| 6,830,597 | B1 | 12/2004 | Green |

OTHER PUBLICATIONS

A.V. Bridgwater et al., An overview of fast pyrolysis of biomass, Organic Geochemistry, 30 (1999) 1479-1493.

Sascha R. A. Kersten et al., Biomass Pyrolysis in a Fluidized Bed Reactor. Part 1: Literature Review and Model Simulations, Ind. Eng. Chem. Res. 2005, 44, 8773-8785.

Xiaoquan Wang et al., Biomass Pyrolysis in a Fluidized Bed Reactor. Part 2: Experimental Validation of Model Results, Ind. Eng. Chem. Res. 2005, 44, 8786-8795.

Henry Mullaney et al. [Executive Director, New Hampshire Industrial Research Center (NHIRC)], Final Report—Technical, Environmental and Economic Feasibility of Bio-Oil in New Hampshire's North Country, Aug. 31, 2002.

A.V. Bridgwater et al., Fast pyrolysis processes for biomass, Renewable and Sustainable Energy Reviews, 4 (2000) 1-73.

Christian Gerdes et al., Design, Construction, and Operation of a Fast Pyrolysis Plant for Biomass, Eng. Life Sci., 2 (2002) 6 167-174.

A. Oasmaa et al., Fast Pyrolysis of Forestry Residue. 1. Effect of Extractives on Phase Separation of Pyrolysis Liquids, Energy & Fuels, vol. 17, No. 1, 2003, published on the web Nov. 28, 2002, pp. 1-12.

International Search Report for International Patent Application No. PCT/CA2006/000933 with a mailing date of Sep. 15, 2006.

Written Opinion of the International Searching Authority for International Patent Application No. PCT/CA2006/000933 with a mailing date of Sep. 15, 2006.

* cited by examiner

APPARATUS AND PROCESS FOR THE PYROLYSIS OF AGRICULTURAL BIOMASS

CROSS-REFERENCE TO RELATED APPLICATIONS

This application is a national entry under 35 U.S.C. 371 of PCT/CA2006/000933, filed Jun. 7, 2006, that claims the benefit of U.S. patent application 60/688,338, filed Jun. 8, 2005, which is incorporated herein by reference.

FIELD OF THE INVENTION

The invention relates to the pyrolysis of agricultural biomass. More particularly, the invention relates to an integrated combustion chamber and fluidized bed pyrolysis reactor that is compact and particularly well suited to mobile operation. A lift tube in fluid communication with the pyrolysis reactor is located within the combustion chamber for circulating biomass and an inert fluidizable media upwardly therethrough; this advantageously increases heat transfer and leads to more rapid pyrolysis. The apparatus and process are especially well suited to the pyrolysis of low density agricultural biomass.

BACKGROUND

Fast pyrolysis is a high temperature process (350 to 800° C.) in which a biologically based feedstock is rapidly heated in the absence of air and vaporizes into a product gas stream. Although the smoke-containing gas stream that is produced comprises both combustible and inert components, of greater interest is a liquid product that is usually condensable therefrom. One common oily liquid product that may be condensed from the product gas stream is dark brown in colour and may be burned as a bio-oil having a heating value of about half that of conventional fuel oil. Other liquid products can contain, for example, flavour enhancing constituents or even pharmaceutically active compounds. The char and ash remaining after pyrolysis can also have value as fuel or chemical feedstocks.

The characteristics of the liquid product depend upon the biological feedstock being used and the processing conditions. In fast pyrolysis, reactions typically take place in less than 3 seconds and are carefully controlled to provide the desired product characteristics. Fluid bed reactors are often used to provide rapid heat and mass transfer and inert solid carriers (eg: silica sand) are sometimes used as an aid in heat transfer and biomass processing. These fluidized bed fast pyrolysis processes are well documented and have been used in many different applications for several decades. See, for example, Bridgwater, A. V.; Peacocke, G. V. C. "Fast pyrolysis processes for biomass" *Renewable and Sustainable Energy Reviews*, v. 4 (2000), pp. 1-73, for a review of prior art fluid bed fast pyrolysis processes developed over the last 20 years.

Low density agricultural biomass (eg: straw, stalks, husks, chaff, bark, wood chips, etc.) is typically widely dispersed within a given geographical area, difficult to collect and expensive to transport economically. In the fast pyrolysis of low density agricultural biomass, a common problem that makes the process uneconomical is the prohibitive cost of transporting these bulky materials to a central processing site. Application of fluid bed fast pyrolysis technology to such materials therefore relies upon a significant reduction or elimination of these material transportation costs. It would be desirable to provide "self contained" fast pyrolysis process equipment that is compact, mobile and has the ability to be set up and operated close to the source of the feed materials. To make it easier for farmers and workmen, particularly in the developing world, to take advantage of such mobile equipment, it would also be desirable that the equipment be simple to operate and flexible in terms of the choice of fuel source. The process employed in using the equipment should be forgiving in terms of particle size and biomass moisture content. The process should also take advantage of rapid heat transfer and short solids residence time to reduce vessel size and increase throughput.

U.S. Pat. Nos. 5,728,271 and 5,853,548 disclose a thermolysis process for liquefaction of biomass solids employing separate combustion and fluidized bed reaction vessels. The process takes place at low temperature and employs long residence times. This process is therefore not suitable for mobile implementation.

U.S. Pat. Nos. 6,048,374 and 6,830,597 disclose a pyrolysis process for gasifying and/or liquefying biomass that employs combined fluidized bed and combustion reactors. The fluidized bed reactor is in the form of a tube and biomass moves downwardly through the tube. The combustion chamber partially surrounds the reactor tube and heat from the combustion chamber passes through the reactor wall and directly heats the biomass within the interior reactor tube. The reactor is in communication with the combustion chamber through a bottom opening that allows char to be consumed in the combustion chamber as fuel. The reactor does not contain any fluidizable media and no fluidized bed is employed, which limits heat and mass transfer within the reactor.

U.S. Pat. Nos. 5,792,340 and 5,961,786 disclose fast pyrolysis processes for the production of a liquid product containing flavour enhancing constituents. The processes employ a fluidized bed transport reactor that utilizes gas velocities high enough to cause biomass and an inert heat carrying media to move upwardly within the reactor. The biomass and inert carrier are separated from the product gas stream by a cyclone and re-introduced into the bottom of the bed. The combustion chamber is separate from the reactor. Although this configuration leads to rapid mass transfer, it requires careful control of particle size, is complicated to operate and is not well-suited to mobile implementation due to its size and energy requirements.

U.S. Pat. No. 4,917,028 discloses a pyrolysis reactor that includes an interior drying zone where biomass moves downwardly, a lower combustion zone where heat is added and where biomass particles are conveyed upwardly, and an outer pyrolysis zone where biomass is fluidized and is deflected back towards the interior drying zone to rain down upon the biomass therein. This reactor does not employ lift tubes but rather circulates the entire bed between the combustion chamber and pyrolysis reactor; as a result, there is both fluid and solid communication between the zones, which makes it difficult to precisely control process conditions and achieve the desired product characteristics.

To date, conventional fast pyrolysis processes employ multiple vessels, are complex to operate, are inflexible and/or are not suitable for mobile operation. Compact systems that combine the combustion chamber and pyrolysis reactor in a single vessel usually involve mixing of fluids and/or solids between the two portions of the vessel; this leads to contamination and/or destruction of the most valuable condensable liquid products in the product gas.

The need therefore exists for an improved apparatus for pyrolysis of low density agricultural biomass and a process for use thereof.

SUMMARY OF THE INVENTION

According to an aspect of the present invention, there is provided an apparatus for the pyrolysis of agricultural biomass comprising: a fluidized bed pyrolysis reactor; a combustion chamber; a lift tube located within the combustion chamber and in fluid communication with the pyrolysis reactor, the lift tube having a lower inlet and an upper outlet; and, a nozzle located within the lift tube proximal the inlet for educting a first inert fluidizable media located within the pyrolysis reactor upwardly through the lift tube.

According to another aspect of the present invention, there is provided a process for the pyrolysis of agricultural biomass comprising: providing an apparatus as described above; creating heat through combustion of fuel in the combustion chamber; fluidizing the first inert fluidizable media in the fluidized bed pyrolysis reactor using a low oxygen content gas; introducing the biomass into the pyrolysis reactor; educting the biomass upwardly through the lift tube with the first inert fluidizable media; transferring the heat from the combustion chamber into the biomass in the lift tube; exiting the heated biomass from the lift tube outlet into the pyrolysis reactor; and, circulating the heated biomass downwardly through the fluidized bed in the pyrolysis reactor.

The combustion chamber may have a common surface with the pyrolysis reactor. The combustion chamber may be cylindrical and the pyrolysis reactor may be located within an annular space about the combustion chamber. In this case, the common surface may then be an annular wall located between the pyrolysis reactor and the combustion chamber. The pyrolysis reactor may be divided into one or more chambers within the annular space and/or may contain one or more baffles to promote mixing or to help direct either biomass or the inert fluidizable media in a desired direction. The bottom of the pyrolysis reactor may comprise a fluid distributor. The fluid distributor may comprise a plate having a plurality of holes and may include means to prevent plugging of the holes by the fluidizable media, the biomass, char, or a combination thereof. The plate may be flat or may be frustoconical in shape in order that the material in the pyrolysis reactor moves inwardly and downwardly toward the lift tube inlet(s).

The combustion chamber may be located within an interior of the apparatus. Any suitable fuel may be burned to create the required heat; for example, the fuel may comprise a gaseous fuel (eg: natural gas or propane), a liquid fuel (eg: diesel fuel), or a solid fuel (eg: wood, coal, etc.). The conditions within the combustion chamber may be carefully selected to produce the most efficient utilization of the fuel, and these conditions may be adjusted depending upon the fuel being used. In order to provide optimal selection of conditions, there is preferably no communication of fluids and/or solids between the combustion chamber and the pyrolysis reactor.

The apparatus may comprise a plurality of lift tubes and the lift tubes may be uniformly spaced apart within the combustion chamber. The combustion chamber is designed to deliver a maximum amount of heat to the biomass, both in the pyrolysis reactor and in the lift tube(s). The lift tube(s) may be finned to increase the rate of heat transfer into the tube(s).

The combustion chamber may comprise a fluidized bed containing a second inert fluidizable media provided to increase heat transfer to the tube and/or the pyrolysis reactor. The second inert fluidizable media may be identical to the first inert fluidizable media, or may be specially selected based on conditions in the combustion chamber. There is preferably no circulation of the inert fluidizable media between the combustion chamber and the pyrolysis reactor. A fluid distributor may be provided within the combustion chamber. The fluid distributor may comprise a plate containing a plurality of holes. The plate may be continuous with the plate used as a fluid distributor in the pyrolysis reactor or may be separable therefrom.

The outlet of at least one of the lift tubes may comprise a directional device for directing the first inert fluidizable media exiting from the lift tube toward a pre-determined location within the pyrolysis reactor. The directional device may comprise a baffle, an angled deflector plate, an elbow, a duct or other suitable structure. The first inert fluidizable media may be directed laterally and/or downwardly relative to an exit direction of the media from the outlet. This may be achieved either through the design of the outlet, the location of the directional device, the design of the directional device, or a combination thereof. The biomass may exit the lift tube into a freeboard area of the pyrolysis reactor.

In one embodiment, the biomass is directed downwardly into the fluidized bed. This may be achieved upon introduction of the biomass to the reactor and/or upon exit of the biomass from the lift tube. The biomass may be introduced into the reactor through the directional device for entrainment with the first inert fluidizable media exiting the lift tube; in this manner, the biomass may be carried downwardly by the media to exit the directional device within the fluidized bed. The pyrolysis reactor may include a suitable opening provided for the introduction of biomass without permitting ingress of oxygen in order to preserve pyrolysis conditions within the reactor. The opening may comprise an airlock solids feeder (eg: a screw type or rotary solids feeder). The opening may admit the biomass directly into one or more directional devices located within the pyrolysis reactor.

The nozzle is provided to entrain both the first inert fluidizable media and the biomass within the lift tube. The nozzle body may be located outside of the lift tube, so long as the nozzle opening is within the lift tube. The nozzle is designed to produce a region of low pressure relative to the bottom of the bed in order to draw media into the lift tube, but also to provide a pressure higher than that at the top of the bed in order that the media moves upwardly through the tube. The design of eduction nozzles is known to persons skilled in the art. The nozzle may include attrition means to cause grinding of the media particles with one another in order to remove char (and/or any ash that may be produced in the pyrolysis reactor) from the media. In this manner, the media is kept clean and the fluidization conditions within the reactor are preserved. The attrition means may include a baffle or other insert within the nozzle opening or within the lift tube for creating a desired fluid flow path that promotes attrition within the tube.

The apparatus of the present invention is particularly well suited to the pyrolysis of low density agricultural biomass (eg: biomass having a density less than that of the first inert fluidizable media). The low density agricultural biomass may comprise straw, stalks, husks, chaff, bark, wood chips, etc. and may comprise a waste product from agriculture or other industries. The introduction of the fluidizable media into the freeboard area of the fluidized bed helps prevent light materials from escaping the bed. The downward circulation of the fluidizable media though the bed also entrains the biomass and advantageously prevents segregation. The introduction of the biomass within the bed is useful in preventing the escape of materials and in causing rapid heat transfer to the biomass.

The apparatus of the present invention is compact and may be readily mounted on a trailer or other mobile vehicle for transportation to various farm locations. This advantageously obviates the need for transporting the biomass over large distances, which dramatically reduces the overall cost of the process. A condensable gaseous product may be produced during the pyrolysis process that has significant economic value when recovered. The condensable gaseous product may comprise a fuel oil product or other complex hydrocarbon oils. The condensable gaseous product can represent a valuable income stream for farmers, particularly in the developing world.

BRIEF DESCRIPTION OF THE DRAWINGS

Having summarized the invention, preferred embodiments thereof will now be described with reference to the accompanying drawings, in which.

DETAILED DESCRIPTION

Figure 1:
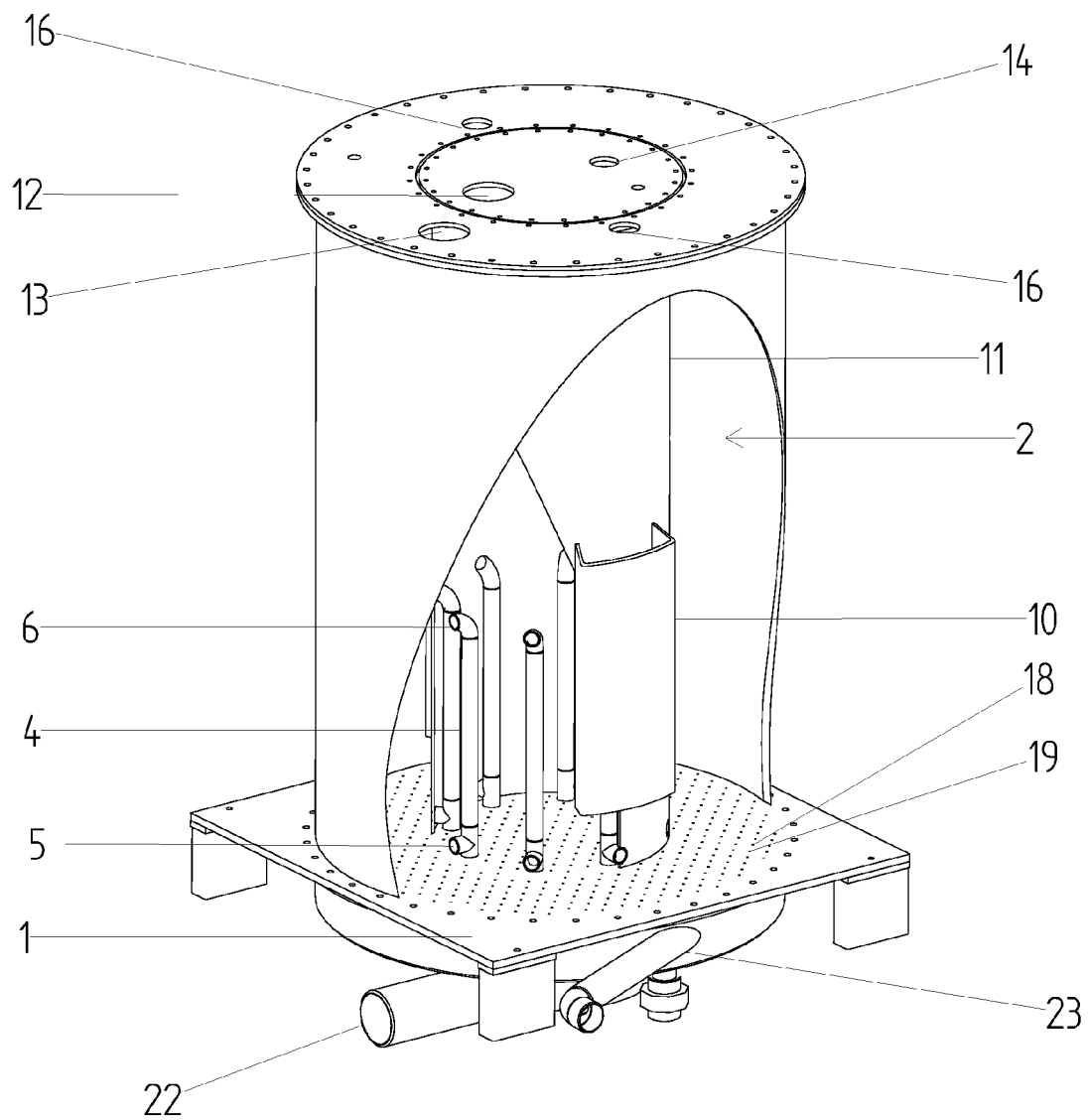
FIG. 1 is a perspective illustration of an interior of an apparatus according to the present invention.
Figure 2:
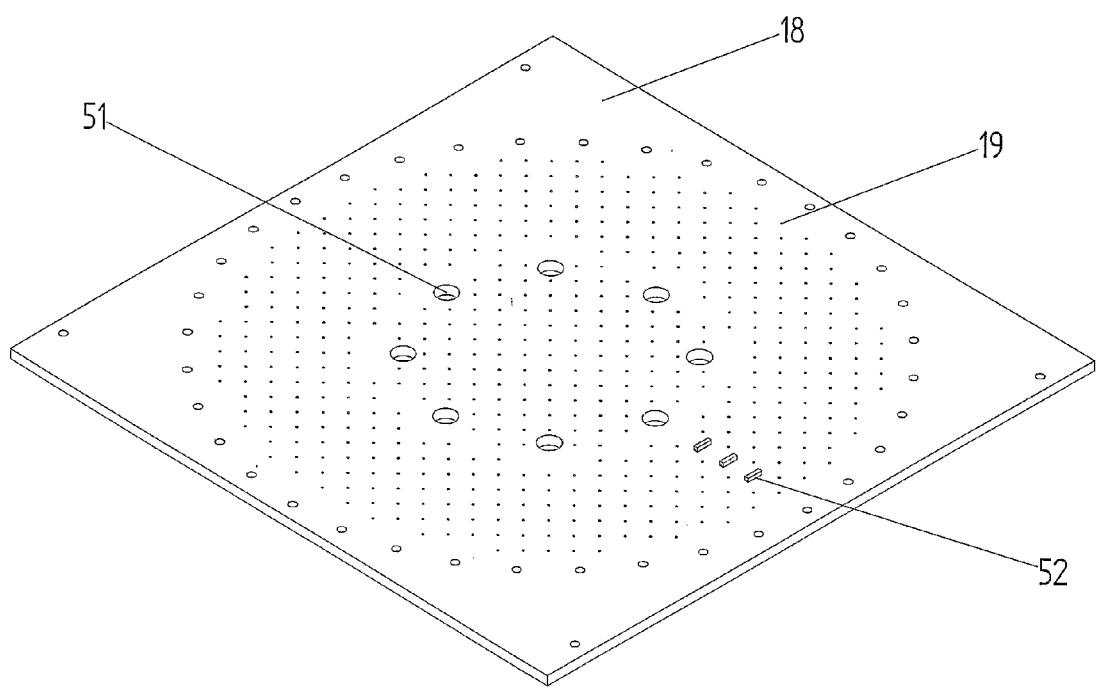
FIG. 2 is a perspective illustration of a distributor plate useful in the apparatus.
Figure 3:
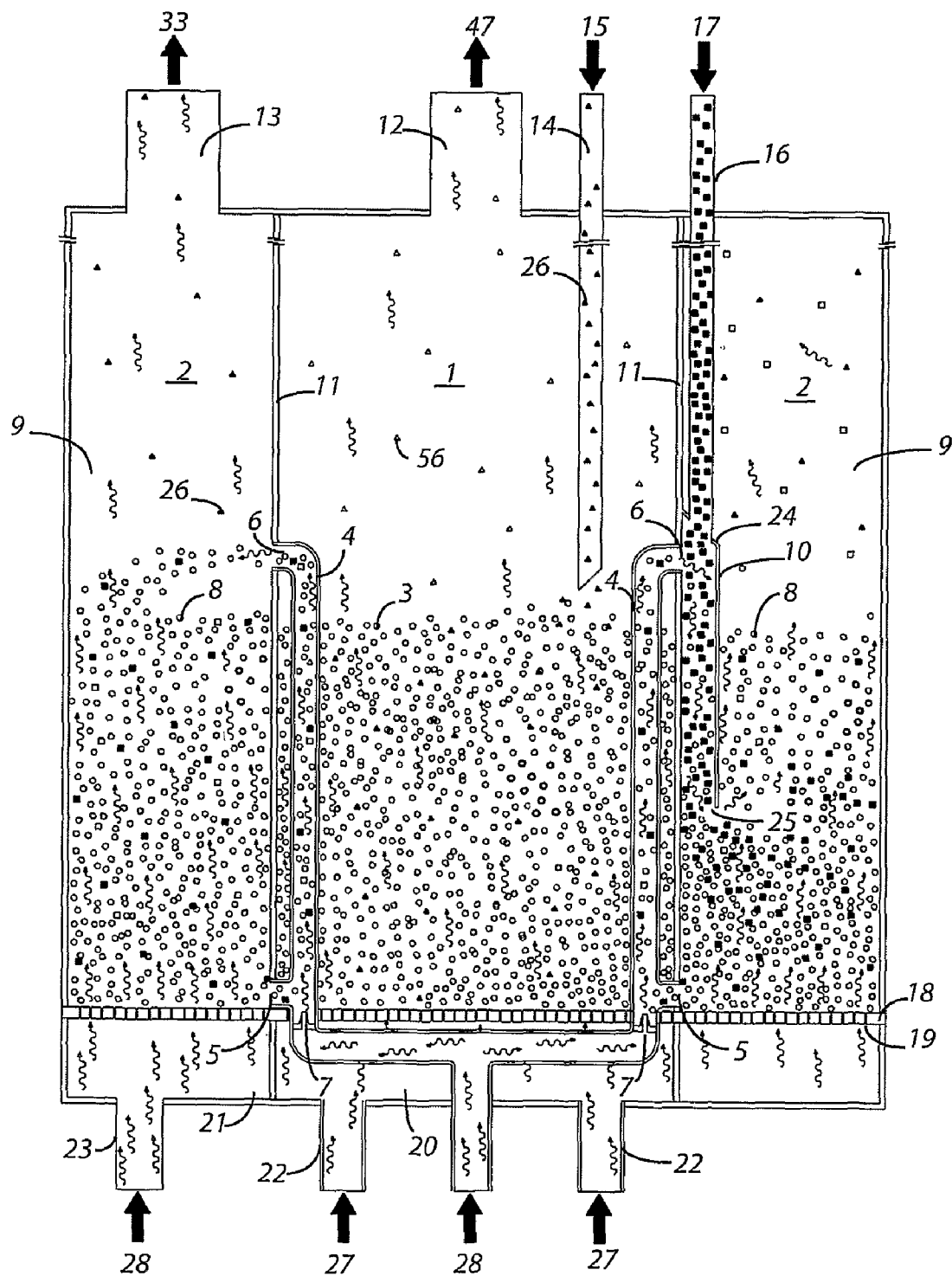
FIG. 3 is a schematic side cross-sectional view of the apparatus, showing the apparatus in operation.

Referring to FIGS. 1-3, an embodiment of an apparatus according to the present invention comprises a central combustion chamber 1 surrounded by an annular fluidized bed pyrolysis reactor 2. The combustion chamber 1 preferably comprises a fluidized bed and is designed to accommodate a second inert fluidizable media 3. A plurality of lift tubes 4 are provided within the combustion chamber 1, each having a lower inlet 5 and an upper outlet 6 located in the pyrolysis reactor 2. Each lift tube 4 includes a nozzle 7 proximal the inlet 5 for educting a first inert fluidizable media 8 located within the pyrolysis reactor 2 upwardly through the lift tube 4. The outlet 6 of each tube 4 is located within a freeboard area 9 of the reactor 2 when the fluidized bed is in operation. A pair of directional devices, each comprising a vertical duct 10, is provided within the pyrolysis reactor 2 on the common wall 11 shared with the combustion chamber 1. Other embodiments of directional devices (eg: elbows, deflector plates, etc.) may be provided on the outlet 6 of other lift tubes 4 to promote tangential or radial mixing within the bed. A flue gas outlet 12 is provided at the top of the combustion chamber 1 and a product gas outlet 13 is provided at the top of the pyrolysis reactor 2. A fuel inlet opening 14 is provided at the top of the combustion chamber 1 that is used to provide a solid fuel 15 (eg: wood, coal, combustible biomass, etc.) and/or recycled char 26 to the combustion chamber. Two biomass inlet ports 16 are provided in the top of the pyrolysis reactor 1 for admitting biomass 17 through a suitable airlock means into the reactor 2. The biomass inlet ports 16 may be connected into the top of the vertical ducts 10 in order to inject the newly added biomass 17 within the bed in a manner as will be more thoroughly described hereinafter.

A distributor plate 18 is provided at the bottom of both the combustion chamber 1 and the pyrolysis reactor 2. The distributor plate 18 comprises a plurality of spaced apart holes 19, the diameter and spacing of which are selected in accordance with known design techniques. Apertures 51 are also included for allowing the lift tubes 4 to pass through the distributor plate 18. Each hole 19 may include means to prevent plugging of the holes upon cessation of upward gas flow through the holes. This may comprise a tee-shaped fitting 52 mounted to each of the holes 19 or a conical shaped hat spaced above the holes using suitable standoffs. The conical shaped hat may include an aperture at the apex thereof allowing the hat to function as a nozzle and promoting attrition of the first inert fluidizable media; this advantageously reduces accumulation of char 26 on the media and preserves its particle size and fluidization characteristics. In the embodiment shown, the distributor plate 18 is continuous throughout the pyrolysis reactor 2 and the combustion chamber 1, allowing the distributor plate to serve as the base for mechanical construction of both parts of the vessel. The portion of the distributor plate 18 within the pyrolysis reactor 2 may be flat or frustoconical in shape to promote the inward and downward movement of media 8 towards the inlet 5 of the lift tubes 4. Of course, the gas flows to the inner and annular portions of the vessel are kept separate by means of separate distribution chambers 20, 21 beneath the plate 18.

One or more air inlets 22 are provided to admit air 27 into the combustion chamber beneath the plate 18. The flow through the air inlets 22 is controlled in order to attain the desired superficial gas velocity for fluidization of the second inert fluidizable media 3. At least one of the air inlets 22 provides air 27 to the vessel that is heated by a burner (not shown), preferably burning gaseous or liquid fuel, located in-line with the air inlet. The burner is used to pre-heat the vessel during start-up and/or to provide supplementary heat generation during operation. With most sources of biomass 17, once the air has been pre-heated the char 26 produced during pyrolysis in the reactor 2 has sufficient residual heat value that a portion of the char can be separated from the product gas 33 and re-introduced into the combustion chamber 1 as the sole source of fuel needed to maintain process temperature. In other instances, supplementary solid fuel 15 may need to be added, either as an alternative or in addition to the char 26.

The combustion chamber 1 may optionally include one or more internal burners (not shown) for the combustion of gaseous or liquid fuel. The internal burner(s) may be used to pre-heat the vessel in advance of combustion of solid fuel 15 and/or char 26, to provide supplementary heat generation during operation, or to provide primary heat generation. The burner(s) may be located above or beneath the distribution plate 18 and connections may be provided on the vessel exterior to admit air and/or fuel to the burner.

Solid fuel 15 and/or char 26 entering through the fuel inlet 14 is preferably provided in a chopped or pulverized form and introduced into the fluidized bed in the combustion chamber 1, where auto-ignition takes place due to high temperature in the presence of excess air 27. The flue gas 47 contains ash 56 that is removed therefrom prior to discharge. Regardless of the source of heating fuel, the pyrolysis reactor 2 is preferably operated at a temperature in excess of 350° C., more preferably from 400 to 900° C., yet more preferably from 450 to 800° C., even more preferably from 500 to 700° C. The combustion chamber 1 is operated at a temperature greater than the pyrolysis reactor 2 and heat transfer takes place through the common annular wall 11 and through the lift tubes 4.

In operation, the pyrolysis reactor 2 receives a flow of low oxygen content gas (anoxic gas) 28 through an anoxic gas inlet port 23. The low oxygen content gas 28 may comprise nitrogen present as nitrogen gas ($N_2$), nitrogen oxides (NOx) or other forms of reduced nitrogen. In a preferred embodiment, the low oxygen content gas comprises the emissions of a diesel engine, for example a diesel engine connected to an electric generator used to power other pieces of process equipment when the apparatus is provided on a trailer as part of a mobile system. Since most diesel engines operate at near stoichiometric air/fuel ratios, the engine exhaust emissions contain very little free oxygen and comprise mainly carbon oxides (COx), nitrogen oxides (NOx), sulfur oxides (SOx), water, some unburned hydrocarbons and particulate matter (soot). Most modern diesel fuels are clean burning and require little or no treatment prior to being introduced to the pyrolysis reactor 2; however, depending upon the fuel source being used, the diesel exhaust stream may require particulate removal and/or SOx scrubbing as pre-treatments.

The low oxygen content gas 28 enters the distribution chamber 21 beneath the pyrolysis reactor 2 through the anoxic gas inlet port 23 and passes upwardly through the distributor plate 18. The reactor 2 contains a first inert fluidizable media 8, for example glass beads or silica sand having a Sauter mean particle diameter in the range of from 0.05 to 1.0 mm, preferably from 0.07 to 0.30 mm. The superficial velocity of the low oxygen content gas 28 is selected to create a uniformly fluidized bed without bubble formation. In order to reduce energy cost, it is desirable that the fluidization gas flowrate is kept to a minimum; however, it is also important that the flowrate is sufficient to promote radial or three-dimensional mixing of solids in order to provide heat transfer from the common wall throughout the reactor. Although the biomass 17 typically has a much lower density than the first inert fluidizable media 8, the particle size is greater and the biomass does not segregate but rather mixes intimately throughout the bed.

Upon fluidization, the bed expands within the reactor 2 until an upper surface is established. The area of the reactor 2 above this upper surface is the freeboard area 9 of the reactor. The outlet 6 of each lift tube 4 is located in the freeboard area 9 and the inlet 5 is at the bottom of the bed. As the inert fluidizable media 8 and entrained biomass 17 exits the tubes 4, it rains down through the freeboard 9 upon the upper surface of the bed. This helps to keep light weight biomass 17 or fines from escaping into the freeboard 9 and being lost through the product gas outlet 13. A directional device may be employed at the outlet 6 to direct the media to a pre-determined position within the reactor 2, for example a radial or tangential position relative to the outlet. This helps to establish a desirable three-dimensional flow profile in the reactor 2 wherein the media 8 moves vertically, radially and/or tangentially within the bed. Use of a frustoconical distributor plate 18 also helps to create a three-dimensional media flow profile by moving the media inwardly as well as downwardly. Since a significant portion of the heat transferred to the pyrolysis reactor 2 comes through the common wall 11 shared with the combustion chamber 1, this three-dimensional media flow profile is useful in transferring heat throughout the reactor.

In the embodiment shown, two vertical ducts 10 are provided. The ducts 10 are situated such that the outlet 6 of a lift tube 4 is located within each duct. Each duct 10 has a top 24 located above the outlet 6 of the lift tube 4 and a bottom opening 25 located above the inlet 5 of the lift tube. When the fluidized bed pyrolysis reactor 2 is in operation, the top 24 is within the freeboard area 9 of the reactor, whereas the bottom opening 25 is located within the fluidized bed. As the first inert fluidizable media 8 and entrained biomass 17 exit the lift tube 4 through the outlet 6, they are deposited within the duct 10 and move downwardly along the common wall 11 to join the bed through the bottom opening 25. Biomass 17 being added to the pyrolysis reactor 2 may be introduced through the top 24 of the duct 10 and entrained with the downwardly moving media 8 in the duct. Intimate contact with the common wall 11 while in the duct 10 promotes rapid heating of the new biomass 17, and introduction of the biomass to the interior of the bed allows it to be mixed immediately with the bed contents, thereby reducing the likelihood of segregation and/or freeboard escape. This advantageously improves the biomass conversion rate and thereby allows a more compact reactor to be built.

A nozzle 7 is located within each lift tube 4 proximal the inlet 5. The nozzle 7 receives a flow of low oxygen content gas 28 provided from the same source as for the pyrolysis reactor 2. Although the density of the bed is relatively constant, there is a decreasing gas pressure gradient across the bed from bottom to top. The flow of gas through the nozzle 7 creates a low pressure in the lift tube 4 relative to the bottom of the bed, which causes the media 8 and entrained biomass 17 to enter the lift tube; however, the gas pressure created by the nozzle is higher than at the top of the bed, which causes the media and entrained biomass to move upwardly through the tube. The design of nozzles for the eduction and pneumatic conveying of solids is known to persons skilled in the art.

The nozzle 7 may also optionally include means to induce attrition in the media 8 as an aid in removing any accumulated char 26 therefrom. The attrition inducing means (not shown) may include a nozzle insert or an impingement device placed in proximity to the nozzle opening. The lift tube 4 may optionally include attrition inducing features. In addition to the removal of char 26, the attrition inducing means is useful in reducing the particle size of the biomass 17, particularly in the case of large biomass particles that have a tendency to settle in the reactor 2 and are directed to the lift tube inlet 5 by the solid flow pattern in the bed and/or the frustoconical distributor plate 18. Although the lift tubes 4 are depicted as being straight, in an alternative embodiment they may be helical to increase residence time and heat transfer surface area within the combustion chamber 1.

The combustion chamber 1 contains a second inert fluidizable media 3. In a preferred embodiment, the second inert fluidizable media 3 is identical to the first inert fluidizable media 8; however, particle size and/or choice of material may be selected based upon desired fluidization conditions in the combustion chamber 1 or the fuel source being used. Preferably, the second inert fluidizable media 3 has a Sauter mean particle diameter in the range of from 0.05 to 1.0 mm, preferably from 0.07 to 0.30 mm. The superficial velocity in the combustion chamber 1 is selected to provide uniformly fluidized non-bubbling flow in the combustion chamber. The second inert fluidizable media 3 is in intimate contact with the common wall 11 and with the lift tubes 4. This promotes efficient heat transfer to the pyrolysis reactor 2. The media 8 and biomass 17 that is conveyed through the lift tubes 4 is exposed to the elevated temperature of the fluid bed in the combustion chamber 1. Additional reaction takes place during transport of material through the lift tubes 4, thereby increasing the reaction rate to a level greater than either the reactor alone or a typical shallow fluid bed could produce.

The combustion chamber 1 may include internal features, such as baffles (not shown), that promote a radial flow pattern in the bed as an aid in ensuring that hot media 3 is constantly being moved to the outside of the bed. The design of the distributor plate 18 may also incorporate features for creating this radial media flow. The height of the fluidized bed in the combustion chamber 1 may be greater than that of the bed in the pyrolysis reactor 2, so that even the elbow portion of the lift tube 4 proximal the outlet 6 may be utilized for heat transfer.

The particle size of biomass feed material 17 is an important parameter in determining the efficacy of pyrolysis. The amount of energy and effort which much be expended to pre-process feed material increases as particle size is reduced. Typical particle size for existing fast pyrolysis systems is less than 3 mm in diameter. Larger sized particles are more difficult to agitate and process in the fluid bed, as they tend to "sink" to the bottom of the bed where heat transfer, ablation and speed of thermal processing are reduced. This has a negative effect on the efficiency of production of bio-oil, which is increased when particle processing time is reduced. The circulation of reactor media in this invention via the vertical tubes 4 makes it possible for particles greater than 3 mm in diameter to remain as part of the bed, rather than simply residing on the bottom. This is particularly true when an inclined frustoconical distributor plate 18 is used, as large particles tend to slide on the plate to the inlet 5 of one of the lift tubes 4 and are circulated from the bottom of the fluid bed upwardly to the top. This increases overall heat transfer and hastens the processing of these larger particles. The ability of this combined vessel to process larger feed material particle sizes reduces the amount of ancillary equipment and energy required for pre-processing and sizing of biomass feed material, which is advantageous in creating a compact mobile processing system.

Figure 4:
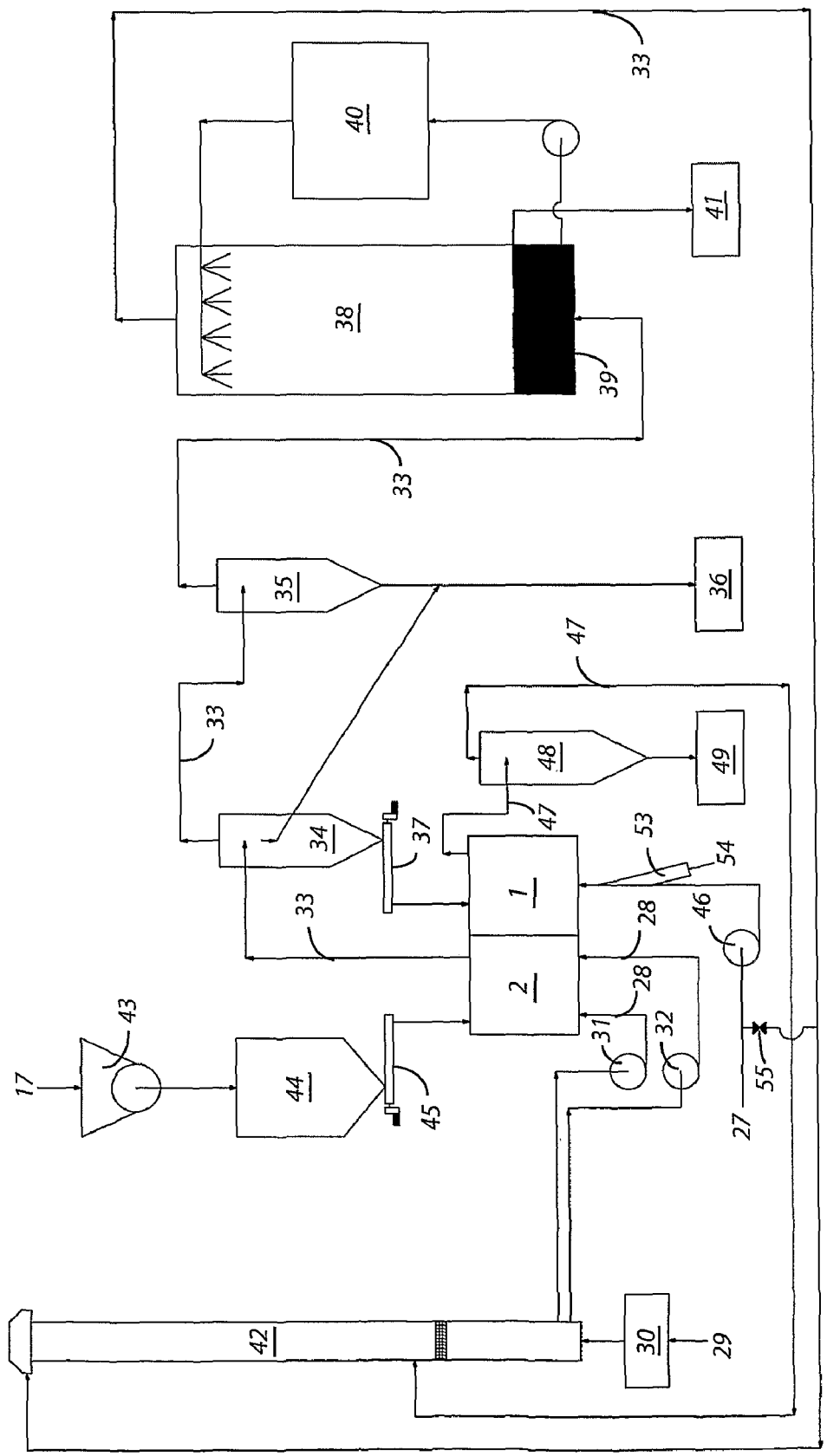
FIG. 4 is a process flow diagram illustrating the apparatus as part of an overall process; and, FIG. 5 is a perspective view of the apparatus and process according to the present invention mounted upon a trailer for mobile operation.
Figure 5:
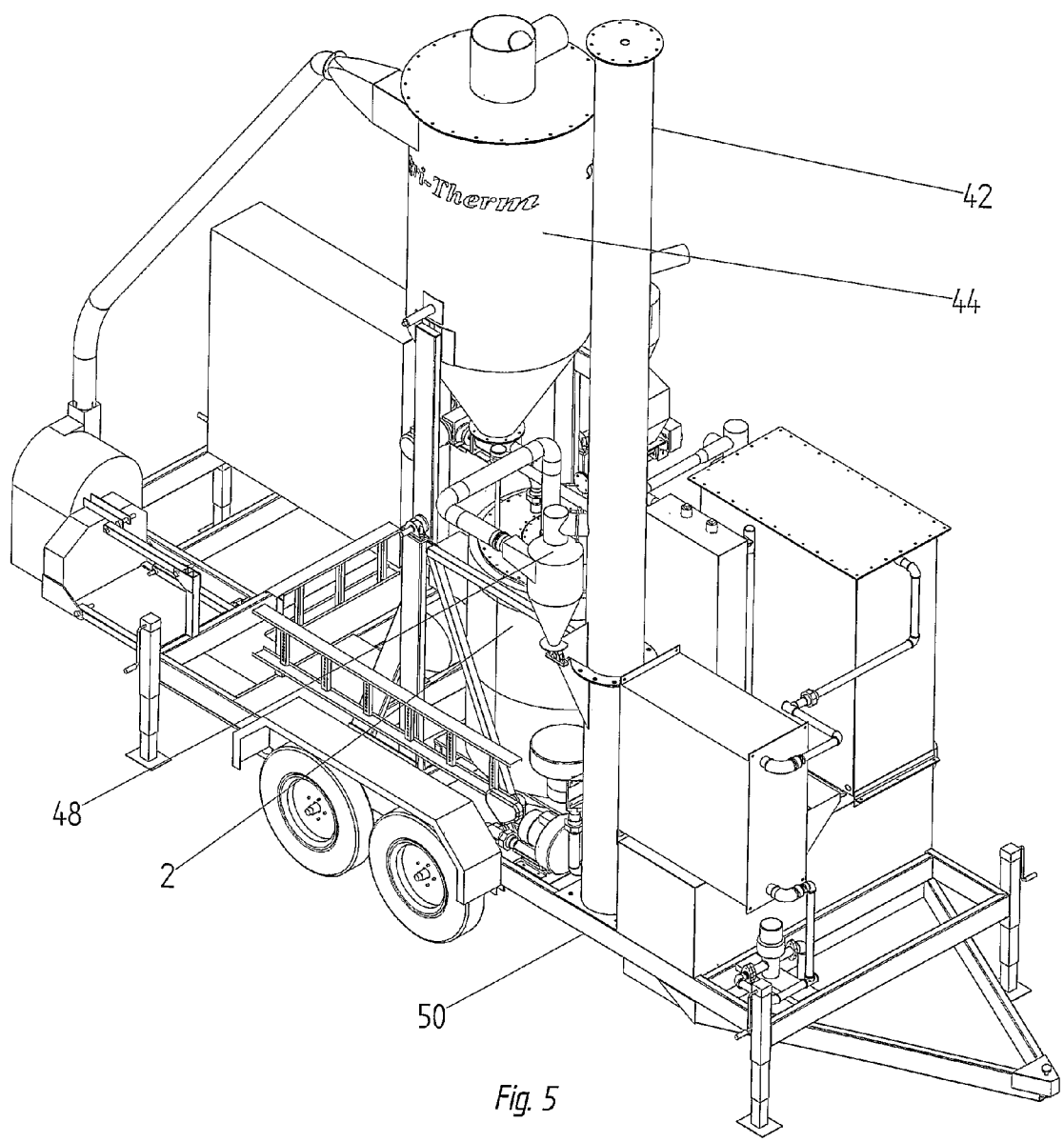

Referring to FIGS. 4 and 5, in a process according to the present invention, low oxygen content gas 28 produced as exhaust emissions from a diesel engine 29 powering an electric generator are passed through a filter 30 to remove particulate matter and then compressed using a blower 31 prior to introduction to the distribution chamber 20 (not shown in FIG. 4) of the pyrolysis reactor 2 through the anoxic gas inlet 23 (not shown in FIG. 4). A portion of this stream 28 is also provided to the nozzles 7 via blower 32. Product gas 33 exiting the gas outlet 13 of the pyrolysis reactor 2 is first passed through a primary cyclone 34 and then through a secondary cyclone 35 to remove any particulate matter therefrom. Particulate matter may include unconverted biomass 17 and/or char 26. Depending upon the biomass source, the char 26 may contain significant quantities of inorganic materials such as phosphorus that are useful, for example, in the making of fertilizer. The particulate matter removed in the cyclones is therefore collected in a bin 36, with a portion of the material collected in the primary cyclone 34 being re-introduced into the combustion chamber 1 through a screw conveyor 37 to serve as a fuel source. The product gas stream 33 may optionally pass through a heat exchanger to pre-heat the incoming low oxygen content gas 28 and/or combustion air 27 being introduced to the apparatus; this heat exchange may take place in one or more stages. The product gas next passes through a spray condenser 38 in order to remove a condensable liquid product 39 therefrom. Once condensed, the liquid is pumped through a fan-radiator type heat exchanger 40 and re-introduced into the spray condenser 38 through a spray header to serve as a coolant in condensing out additional liquid product. Other types of heat exchangers may be used. Excess liquid product is accumulated in an oil reservoir 41. In one embodiment, the condensable liquid product 39 may comprise a bio-oil having a useful fuel value; however, depending upon the biomass feedstock used, the condensable product may comprise compositions useful as flavour enhancers or pharmaceutical compounds. After collection, the condensed liquid product 39 may optionally be sent to downstream purification operations (not shown). The cooled and condensed product gas stream 33 exits the spray condenser 38 into a gas flare 42 in order to burn off any uncondensed flammable product as an emission control measure. Alternatively, the cooled and condensed product gas stream 33 may be directed to the furnace 1 along with the combustion air 27 via bypass valve 55 in order to utilize the heat value of any non-condensed combustible products.

Prior to introduction to the reactor 2, biomass 17 is dried, if necessary, to a moisture content of 10% or less and then chopped or ground to a size of approximately 3 mm using grinder 43. The biomass 17 may be optionally screened in order that the correct size range is provided. The dried and sized biomass 17 is stored in a hopper 44 and fed to the pyrolysis reactor 2 through an airlocked rotary solids feeder 45. The rotary solids feeder 45 comprises a screw conveyor with a substantially sealed auger mechanism to reduce or prevent the ingress of air along with the biomass 17. Alternatively, the biomass 17 may be purged with substantially oxygen free gas (for example, the low oxygen content gas 28) prior to introduction to the reactor 2. The biomass 17 enters one of two vertical ducts 10 (not shown in FIG. 4) within the pyrolysis reactor 2 for injection into the fluidized bed.

Combustion air 27 is compressed using a blower 46 and optionally filtered before being introduced to the combustion chamber 1 through the air inlet 22 (not shown in FIG. 4). Char 26 removed from the product gas stream 33 by the primary cyclone 34 is provided to the combustion chamber 1 and mixed with the air 27 in the fluidized bed, where auto-ignition takes place due to the high ambient temperatures in the combustion chamber. To pre-heat the combustion chamber 1 on startup, an in-line burner 53 is provided having a gaseous fuel source 54 (eg: natural gas, propane, etc.). The in-line burner 53 could alternatively be provided within the combustion chamber 1. Flue gases 47 exiting the combustion chamber 1 through the flue gas outlet 12 (not shown in FIG. 4) are passed through a flue gas cyclone 48 and the hot ash collected therefrom is accumulated in a suitable receptacle 49. The ash collected in receptacle 49 may have commercial value, for example as a concrete additive or other building material. Attrition inducing means (for example, nozzles) may be utilized in the combustion chamber 1 to prevent accumulation of ash on the second inert fluidizable media 3. The hot flue gases may be optionally directed through a flue gas heat exchanger (not shown) that is used to pre-heat the incoming air stream 27 and/or the low oxygen content gas stream 28. Optional flue gas treatment, for example using a catalytic converter, a filter, and/or a scrubber, takes place prior to discharge of the flue gas through the flare 42.

Referring specifically to FIG. 5, the apparatus of the present invention may be mounted on a trailer 50 along with the various components described above in order to create a mobile processing system. Only some of the process components depicted in FIG. 4 are visible in FIG. 5, and still others have been omitted for clarity. The apparatus of the present invention is particularly well suited to mobile operation due to its compact size, ease of operation, and robustness in terms of feed material pre-treatment.

The foregoing describes preferred embodiments of the invention and is not to be construed in a limiting sense. Variants or mechanical equivalents to the way in which the invention works will be apparent to those skilled in the art, along with further features and sub-combinations, and are intended to be encompassed by the following claims.

The invention claimed is:

1. An apparatus for the pyrolysis of agricultural biomass comprising:
   a) a fluidized bed pyrolysis reactor;
   b) a combustion chamber having a common wall with the fluidized bed pyrolysis reactor;
   c) a lift tube having (i) a lower inlet within the pyrolysis reactor and (ii) an upper outlet within the pyrolysis reactor, the lift tube extending from the inlet to the outlet through the common wall and into the combustion chamber, for recirculation of media within the pyrolysis reactor;

d) a nozzle having an opening located within the lift tube proximal the inlet and configured for educting a first inert fluidizable media located within the pyrolysis reactor upwardly through the lift tube; and
e) wherein, the lift tube is configured to provide heat from the combustion chamber to the recirculating media within the lift tube.

2. The apparatus according to claim 1, wherein the common wall of the combustion chamber is substantially cylindrical.

3. The apparatus according to claim 2, wherein the pyrolysis reactor has a cylindrical reactor outer wall, and wherein the common wall is located concentrically within the pyrolysis reactor outer wall, the fluidized bed of the pyrolysis reactor being located within an annular space about the combustion chamber bounded by the reactor wall and the common wall.

4. The apparatus according to claim 1, wherein the combustion chamber comprises a fluidized bed containing a second inert fluidizable media.

5. The apparatus according to claim 1, wherein the lift tube is configured to prevent fluid or solids communication between the pyrolysis reactor and the combustion chamber.

6. The apparatus according to claim 1, wherein the outlet comprises a directional device for directing the first inert fluidizable media exiting from the lift tube toward a predetermined location within the pyrolysis reactor.

7. The apparatus according to claim 6, wherein the directional device comprises a duct.

8. The apparatus according to claim 6, wherein the directional device is situated within the outlet and includes structure to direct the first inert fluidizable media exiting the outlet in a downward direction.

9. The apparatus according to claim 6, wherein the pyrolysis reactor includes an opening for providing biomass to the pyrolysis reactor through the directional device for entrainment with the first inert fluidizable media exiting the lift tube.

10. The apparatus according to claim 1, further comprising a plurality of lift tubes.

11. The apparatus according to claim 1, wherein the apparatus is mounted on a trailer.

* * * * *